US011000763B2

(12) United States Patent
Minamino et al.

(10) Patent No.: US 11,000,763 B2
(45) Date of Patent: May 11, 2021

(54) INFORMATION PROCESSING APPARATUS AND METHOD OF CONVERTING OPERATION SIGNAL

(71) Applicant: SONY INTERACTIVE ENTERTAINMENT INC., Tokyo (JP)

(72) Inventors: Takanori Minamino, Kanagawa (JP); Yoshiyuki Imada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/494,176

(22) PCT Filed: Mar. 30, 2018

(86) PCT No.: PCT/JP2018/013760
§ 371 (c)(1),
(2) Date: Sep. 13, 2019

(87) PCT Pub. No.: WO2018/186303
PCT Pub. Date: Oct. 11, 2018

(65) Prior Publication Data
US 2020/0016486 A1    Jan. 16, 2020

(30) Foreign Application Priority Data

Apr. 6, 2017   (JP) .............................. JP2017-076256

(51) Int. Cl.
*A63F 13/30*   (2014.01)
*A63F 13/22*   (2014.01)
(Continued)

(52) U.S. Cl.
CPC .............. *A63F 13/30* (2014.09); *A63F 13/22* (2014.09); *A63F 13/24* (2014.09); *A63F 13/40* (2014.09);
(Continued)

(58) Field of Classification Search
None
See application file for complete search history.

(56) References Cited

U.S. PATENT DOCUMENTS 5,877,748 A * 3/1999 Redlich .................. G06F 3/011
345/159
8,133,119 B2 * 3/2012 Finocchio ............... A63F 13/22
463/37
(Continued)

FOREIGN PATENT DOCUMENTS

JP    2012-185218 A    9/2012
JP    2012-238045 A    12/2012
(Continued)

OTHER PUBLICATIONS

International Preliminary Report on Patentability dated Oct. 17, 2019, from International Application No. PCT/JP2018/013760, 13 sheets.
(Continued)

*Primary Examiner* — Seng H Lim
(74) *Attorney, Agent, or Firm* — Katten Muchin Rosenman LLP (57) ABSTRACT

An acquisition section 100 acquires a mouse operation signal. A dead zone adjustment section 126 adds a signal part corresponding to a dead zone set to an analog stick, to the mouse operation signal. An analog stick operation signal generation section 128 generates an analog stick operation signal from the mouse operation signal having been subjected to dead zone adjustment. An output processing section 150 provides the generated analog stick operation signal to a game. The dead zone adjustment section 126 adds the signal part corresponding to the dead zone in a direction in which an operation angle of a mouse is maintained.

8 Claims, 8 Drawing Sheets

(51) Int. Cl.
  *A63F 13/24*  (2014.01)
  *A63F 13/40*  (2014.01)
  *G01S 19/48*  (2010.01)
  *G06F 3/02*   (2006.01)
  *G06F 3/038*  (2013.01)

(52) U.S. Cl.
  CPC ............ *G01S 19/48* (2013.01); *G06F 3/0219* (2013.01); *G06F 3/038* (2013.01)

(56) References Cited

U.S. PATENT DOCUMENTS

| | | | |
|---|---|---|---|
| 10,137,370 B2* | 11/2018 | Aizawa | G06F 3/011 |
| 2010/0081507 A1* | 4/2010 | Finocchio | A63F 13/23 |
| | | | 463/37 |
| 2012/0289336 A1 | 11/2012 | Matsuda et al. | |
| 2013/0063343 A1 | 3/2013 | Podoloff | |
| 2017/0056768 A1 | 3/2017 | Aizawa et al. | |
| 2020/0061455 A1* | 2/2020 | Muramatsu | A63F 13/24 |

FOREIGN PATENT DOCUMENTS

| | | |
|---|---|---|
| JP | 2013-106963 A | 6/2013 |
| JP | 2015-164450 A | 9/2015 |
| JP | 2015-216611 A | 12/2015 |

OTHER PUBLICATIONS

International Search Report and Written Opinion dated Jun. 26, 2018, from International Application No. PCT/JP2018/013760, 9 sheets.

* cited by examiner

|  | SIGNAL VALUE | SIGNAL VALUE TO WHICH PREVIOUS ROUND-OFF ERROR IS ADDED | SIGNAL VALUE AFTER ROUND-OFF PROCESS | ROUND-OFF ERROR |
|---|---|---|---|---|
| N | 130.4 | 130.4 | 130 | 0.4 |
| N+1 | 125.3 | 125.7 | 126 | −0.3 |
| N+2 | 132.6 | 132.3 | 132 | 0.3 |
| N+3 | 113.4 | 113.7 | 114 | −0.3 |

INFORMATION PROCESSING APPARATUS AND METHOD OF CONVERTING OPERATION SIGNAL

TECHNICAL FIELD

The present invention relates to a technique for providing an operation signal of an input device to a game.

BACKGROUND ART

PTL 1 discloses a keyboard having functions of a game controller. This keyboard includes allotment keys to which functions of operation buttons of a game controller are assigned, a pointing stick, and a modifier key. When the pointing stick is operated with the modifier key operated, the keyboard outputs an operation signal of an analog stick of the game controller.

CITATION LIST

Patent Literature

[PTL 1]
U.S. Patent Application Publication No. 2012/0289336

SUMMARY

Technical Problem

A game dedicated machine, which is premised on user's operation of a dedicated controller, receives the operation signal of the dedicated controller, and provides the operation signal to the game.

Meanwhile, user's game playing on a general-purpose personal computer (PC) with a mouse or a keyboard utilized as an input device has become popular. Owing to this, the number of users who prefer the mouse or the keyboard over the dedicated controller in playing games is increasing. Therefore, demand rises for user to be able to utilize the mouse or the keyboard as the input device even with an information processing apparatus such as the game dedicated machine.

An object of the present invention is, therefore, to provide an information processing apparatus that provides an operation signal of a controller to a game and a technique that enables a user to utilize an input device such as a mouse with the information processing apparatus.

Solution to Problem

To solve the above problem, an information processing apparatus according to one aspect of the present invention is an information processing apparatus for providing an operation signal of a controller to a game including: an acquisition section that acquires a mouse operation signal; a conversion processing section that converts the mouse operation signal into an analog stick operation signal of the controller; and an output processing section that provides the analog stick operation signal obtained by conversion to the game. The conversion processing section includes a dead zone adjustment section that adds a signal part corresponding to a dead zone set to an analog stick, to the mouse operation signal; and an analog stick operation signal generation section that generates the analog stick operation signal from the mouse operation signal having been subjected to dead zone adjustment. The dead zone adjustment section adds the signal part corresponding to the dead zone in a direction in which an operation angle of a mouse is maintained.

According to another aspect of the present invention, a method of converting an operation signal is provided. This method is a method of converting an operation signal of a mouse into an operation signal of an analog stick in an information processing apparatus for providing the operation signal of the analog stick to a game, the method including: a step of acquiring a mouse operation signal; a step of adding a signal part corresponding to a dead zone set to an analog stick, to the mouse operation signal; and a step of generating an analog stick operation signal from the mouse operation signal having been subjected to dead zone adjustment. The step of adding the signal part corresponding to the dead zone includes adding the signal part corresponding to the dead zone to the mouse operation signal in a direction in which an operation angle of the mouse is maintained.

Optional combinations of the aforementioned constituting elements, and implementations of the invention in the form of methods, apparatuses, systems, recording media, computer programs, and so forth may also be practiced as additional modes of the present invention.

DESCRIPTION OF EMBODIMENT

Figure 1:
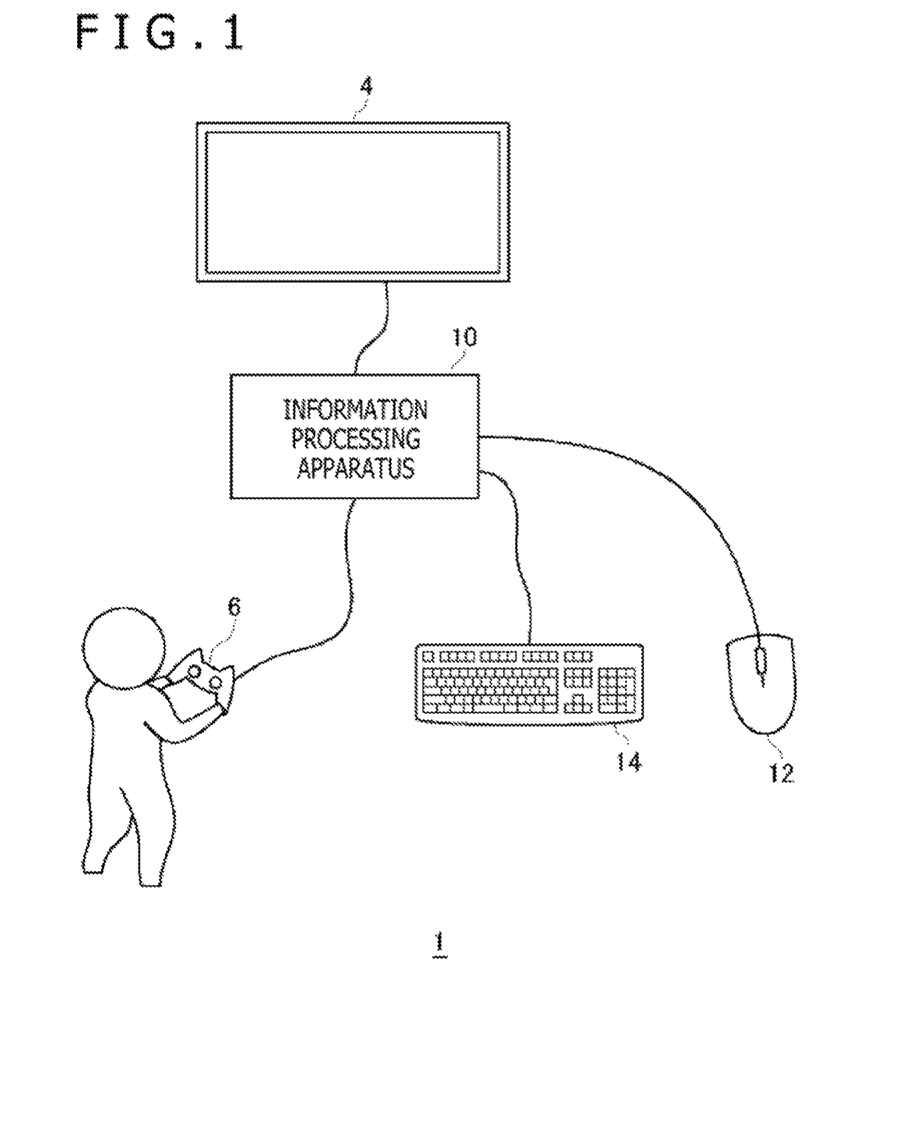
FIG. 1 is a diagram depicting an information processing system according to an embodiment.

FIG. 1 depicts an information processing system 1 according to an embodiment. The information processing system 1 includes an information processing apparatus 10, an output device 4 having a display function such as a television, and a game controller 6 that is an input device. The information processing system 1 also includes a general-purpose mouse 12 and a general-purpose keyboard 14 that serve as input devices. The information processing apparatus 10 is a game apparatus that executes game software and is communicably connected to the dedicated game controller 6. While the information processing apparatus 10 is connected to the game controller 6 by a cable over wired connection in an example of FIG. 1, the information processing apparatus 10 may be connected to the game controller 6 over wireless connection. The game controller 6 is operated by a user and transmits a game operation signal indicating an operation content to the information processing apparatus 10. The information processing apparatus 10 receives the game operation signal from the game controller 6 and provides the game operation signal to a game, and the game reflects the game operation signal in a motion of a game character in a game space.

Figure 2:
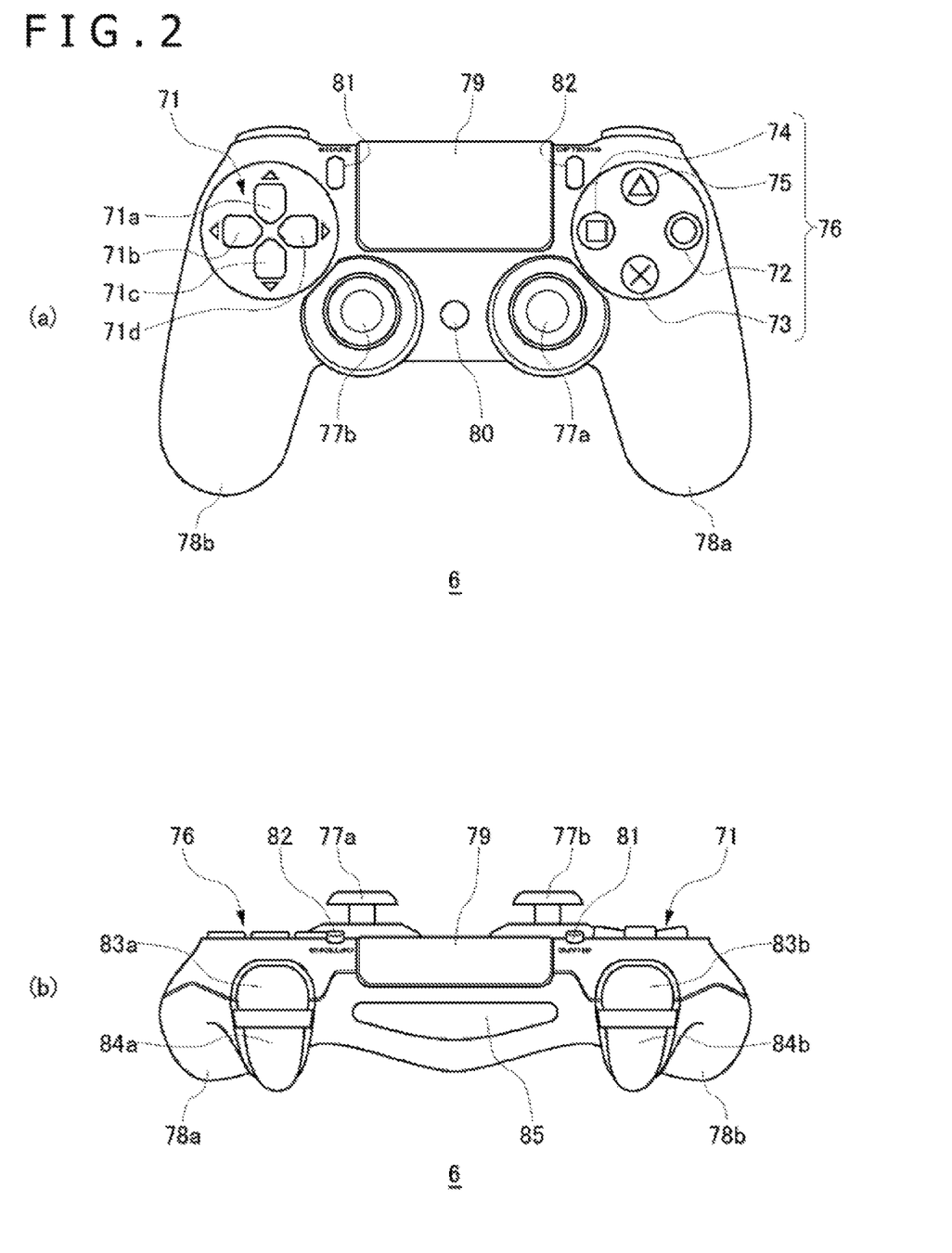
FIG. 2 represents diagrams each depicting an outward appearance of a game controller.

Input sections provided in the game controller 6 will be described below.

[Configuration of Upper Surface Portion]

FIG. 2(*a*) depicts an upper surface of the game controller 6. The user grasps a left grip section 78*b* with a left hand and grasps a right grip section 78*a* with a right hand, thereby operating the game controller 6. A direction button 71, analog sticks 77*a* and 77*b*, and operation buttons 76 are provided on an upper surface of a housing of the game controller 6. The direction button 71 includes an UP button 71*a*, a LEFT button 71*b*, a DOWN button 71*c*, and a RIGHT button 71*d*. Different graphics are marked in different colors on four types of operation buttons 76 to discriminate the operation buttons 76, the ○ button 72 is marked with a red circle, the × button 73 is marked with a blue cross, the □ button 74 is marked with a purple quadrangle, and the Δ button 75 is marked with a green triangle.

The right analog stick 77*a* and the left analog stick 77*b* are input sections to each of which a direction and a tilt amount are input. Each of the right analog stick 77*a* and the left analog stick 77*b* also functions as a push-down button to be depressed by a user by 'pushing the button and returned to an original position by 'removing the user's hand from the button. A button function by pressing using the right analog stick 77*a* will be referred to as "R3 button," while a button function by pressing using the left analog stick 77*b* will be referred to as "L3 button." A touch-pad 79 is provided in a flat region between the direction button 71 and the operation buttons 76 on the upper surface of the housing. The touch-pad 79 also functions as a push-down button to be depressed by the user by 'pushing the button and returned to an original position by 'removing the user's hand from the button.

A home button 80 is provided between the right analog stick 77*a* and the left analog stick 17*b*. The home button 80 is used to power on the game controller 6 and, at the same time, to activate a communication function for the wireless connection to the information processing apparatus 10. After the connection of the game controller 6 to the information processing apparatus 10, the home button 80 is also used to display a menu screen on the information processing apparatus 10.

A SHARE button 81 is provided leftward of the touch-pad 79. The SHARE button 81 is utilized to input a user's instruction on system software. An OPTIONS button 82 is provided rightward of the touch-pad 79. The OPTIONS button 82 is utilized to input a user's instruction on the game. Each of the SHARE button 81 and the OPTIONS button 82 may be formed as a push button.

[Configuration of Back Side Surface Portion]

FIG. 2(*b*) depicts a back side surface of the game controller 6. The touch-pad 79 is provided to extend on an upper side of a back side surface of the housing of the game controller 6 in a such manner as to be bent from the upper surface of the housing, and a horizontally long light-emitting section 85 is provided on a lower side of the back side surface of the housing. The light-emitting section 85 has red (R), green (G), and blue (B) light-emitting diodes (LEDs), and is turned on in accordance with light-emitting color information transmitted from the information processing apparatus 10. An R1 button 83*a* and an R2 button 84*a* are provided at positions longitudinally and bilaterally symmetric with respect to positions of an L1 button 83*a* and L2 button 84*b* on the back side surface of the housing. The R1 button 83*a* and the R2 button 84*a* are operated by a forefinger and a middle finger of the user's right hand, respectively, while the L1 button 83*b* and the L2 button 84*b* are operated by a forefinger and a middle finger of the user's left hand, respectively. The R1 button 83*a* and the L1 button 83*b* on the upper side may be each configured as a push button, while the R2 button 84*a* and the L2 button 84*b* on the lower side may be each configured as a rotatably supported trigger button.

Figure 3:
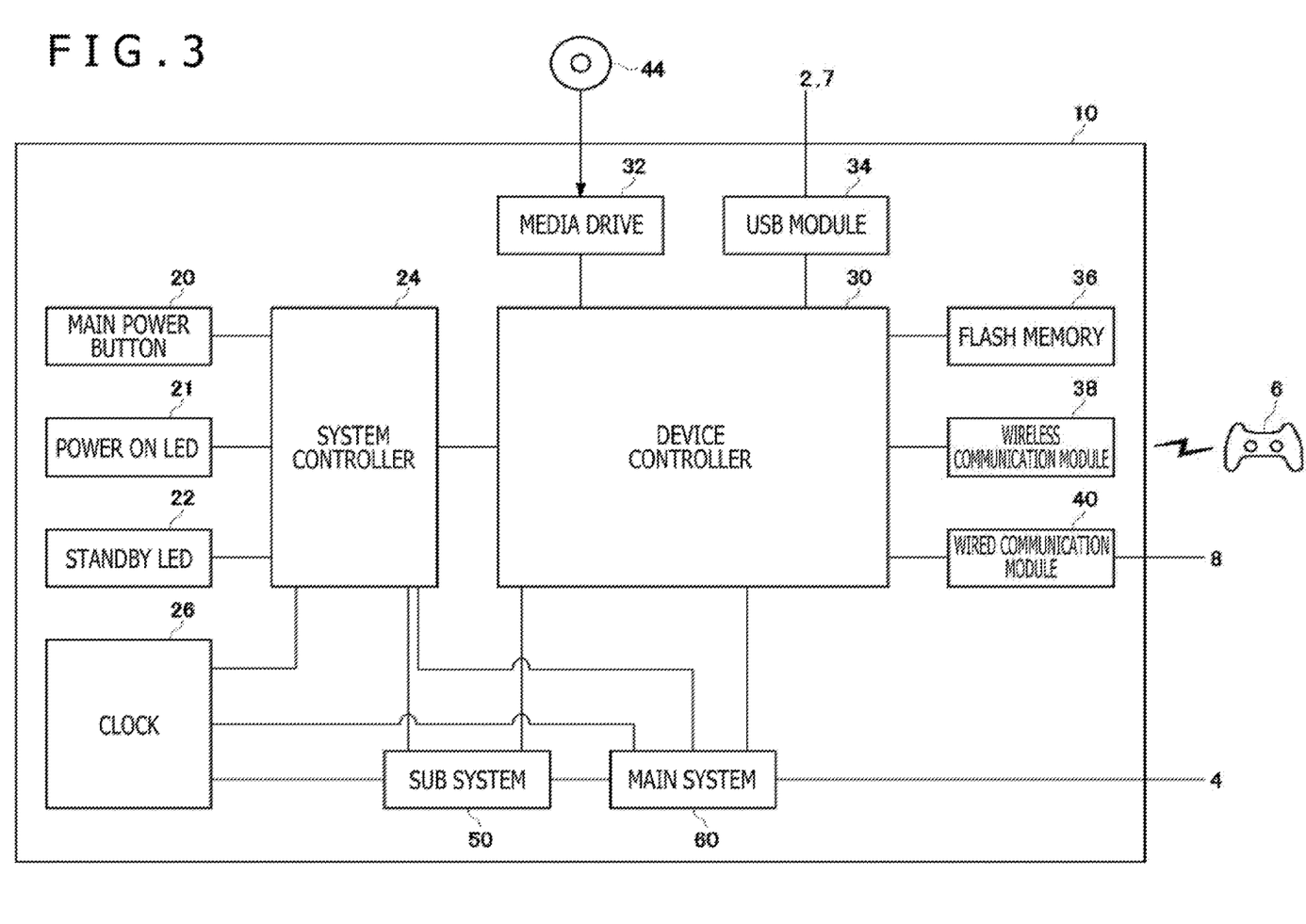
FIG. 3 is a diagram depicting functional blocks of an information processing apparatus.

FIG. 3 depicts functional blocks of the information processing apparatus 10. The information processing apparatus 10 is configured with a main power button 20, a power ON LED 21, a standby LED 22, a system controller 24, a clock 26, a device controller 30, a media drive 32, a universal serial bus (USB) module 34, a flash memory 36, a wireless communication module 38, a wired communication module 40, a sub system 50, and a main system 60.

The main system 60 includes a main central processing unit (CPU), a memory that serves as a main storage device, a memory controller, a graphics processing unit (GPU), and the like. The GPU is mainly utilized for a computing process of a game program. These functions may be configured as a system-on-a-chip and formed on one chip. The main CPU functions to activate the system software and to execute the game in an environment provided by the system software.

The sub system 50 includes a sub CPU, a memory that serves as a main storage device, a memory controller, and the like, and does not include a GPU. The sub CPU operates while the main CPU is in a standby state, and a processing function of the sub CPU is limited to hold down power consumption.

The main power button 20 is provided on a front surface of the housing of the information processing apparatus 10 and operated to turn on or off the supply of power to the main system 60. The power ON LED 21 lights up when the main power button 20 is turned on, while the standby LED 22 lights up when the main power button 20 is turned off.

The system controller 24 detects user's depression of the main power button 20. The clock 26, which is a real time clock, generates current date information and supplies the current date information to the system controller 24, the sub system 50, and the main system 60.

The device controller 30 is configured as a large-scale integrated circuit (LSI) that executes, like a southbridge, delivery of information between devices. As depicted in FIG. 3, devices such as the system controller 24, the media drive 32, the USB module 34, the flash memory 36, the wireless communication module 38, the wired communication module 40, the sub system 50, and the main system 60 are connected to the device controller 30.

The device controller 30 absorbs a disparity in electrical characteristics and a difference in data transfer rate among the devices and controls data transfer timing.

The media drive 32 is a drive apparatus that drives a read-only memory (ROM) medium 44 attached thereto and recording application software such as a game and license information, and that reads a program, data, and the like from the ROM medium 44. The ROM medium 44 is a read only recording media such as an optical disc, a magneto-optical disc, and a Blu-ray disc.

The USB module 34 is a module connected to an external apparatus by a USB cable. The flash memory 36 is an auxiliary storage device that configures an internal storage. The wireless communication module 38 wirelessly communicates with the game controller 6 in accordance with a communication protocol such as a Bluetooth (registered trademark) protocol or the IEEE802.11 protocol. The wired communication module 40 holds wired communication with an external apparatus and is connected to a network via, for example, an access point (AP).

In the embodiment, the information processing apparatus 10 is a game dedicated machine and the game controller 6 is an input device dedicated to the information processing apparatus 10. The game executed by the game dedicated machine is configured to operate on the basis of the game operation signal from the dedicated input device; thus, a conventional game dedicated machine receives the game operation signal only from the dedicated input device.

Meanwhile, with the recent dissemination of PC games, the number of users playing games using a general-purpose input device such as the mouse 12 or the keyboard 14 is increasing. Such users often desire to use a favorite general-purpose input device even at a time of playing a game with the game dedicated machine. Under the circumstances, the information processing apparatus 10 according to the embodiment enables the user to utilize the mouse 12 or the keyboard 14 as the input device from which the game operation signal is input.

While the game executed by the game dedicated machine operates on the basis of the operation signal from the dedicated input device as described above, the game is not designed to respond to an operation signal from the general-purpose input device. To enable the user to utilize the mouse 12 or the keyboard 14 as the game input device, it is necessary to convert an operation signal input from the mouse 12 or the keyboard 14 into an operation signal of the game controller 6 before the operation signal is provided to the game.

As one approach, a method of incorporating conversion modules into the mouse 12 and the keyboard 14 and converting, by each conversion module, an input signal into an operation signal of the game controller 6 is conceivable. However, the mouse 12 and the keyboard 14 into each of which the conversion module is incorporated are no longer general-purpose input devices; thus, the user is required to newly obtain the mouse 12 and the keyboard 14 into each of which the conversion module is incorporated. To address the problem, the embodiment proposes a mechanism in which the general-purpose mouse 12 or keyboard 14 can be used as the input device for the information processing apparatus 10 as it is.

Figure 4:
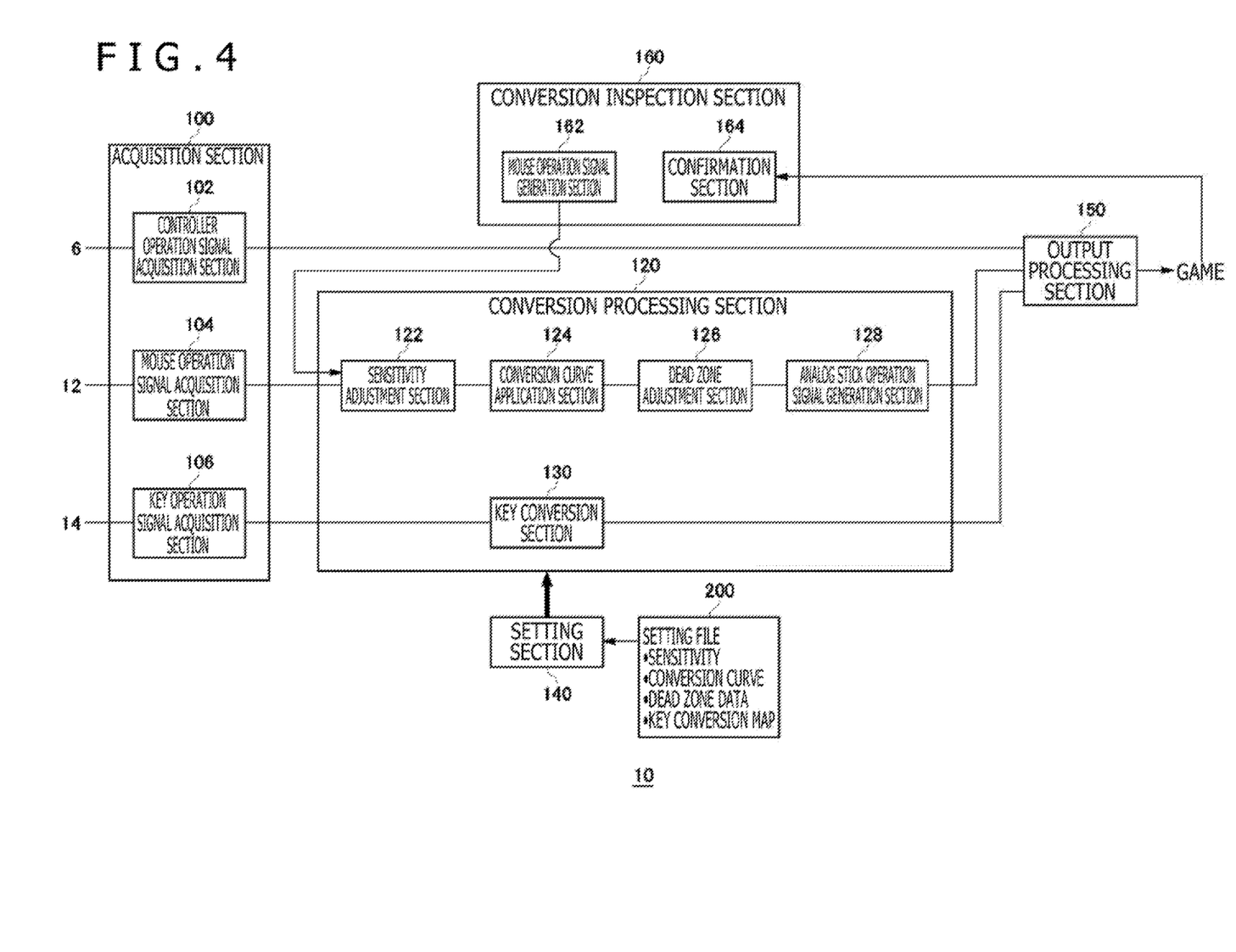
FIG. 4 is a diagram depicting a configuration of the information processing apparatus.

FIG. 4 depicts a configuration of the information processing apparatus 10 that provides the operation signal of the game controller 6 to a game. The information processing apparatus 10 includes an acquisition section 100, a conversion processing section 120, a setting section 140, an output processing section 150, and a conversion inspection section 160. The acquisition section 100 has a controller operation signal acquisition section 102, a mouse operation signal acquisition section 104, and a key operation signal acquisition section 106. The conversion processing section 120 has a sensitivity adjustment section 122, a conversion curve application section 124, a dead zone adjustment section 126, an analog stick operation signal generation section 128, and a key conversion section 130. The conversion inspection section 160 has a mouse operation signal generation section 162 and a confirmation section 164.

In FIG. 4, the elements described as functional blocks performing various processes can be configured by a circuit block, a memory, and other LSI as hardware, and realized by system software and the like loaded into the memory as software. Therefore, a person skilled in the art would understand that these functional blocks can be realized in various manners by hardware only, software only, or a combination of hardware and software, and a realization scheme is not limited to a specific scheme.

The controller operation signal acquisition section 102 acquires an operation signal of the game controller 6 and provides the operation signal to the output processing section 150, and the output processing section 150 provides the operation signal of the game controller 6 to the game.

In the game controller 6 depicted in FIG. 2, the right analog stick 77a is operated to aim a telescopic sight in, for example, a first-person shooter (FPS) game. The right analog stick 77a, which is urged by a spring or the like to maintain a center position, outputs an analog value indicating a tilted two-dimensional position, that is, an operation signal indicating movement amounts of an X-axis component arid a Y-axis component moving from the center position that is assumed as an origin when the user tilts the right analog stick 77a from the center position. The output processing section 150 performs a round-off process on the operation signal of the right analog stick 77a, generates an operation signal containing an X-axis component and a Y-axis component each expressed by an eight-bit digital value, and provides the operation signal to the game.

Figure 5:
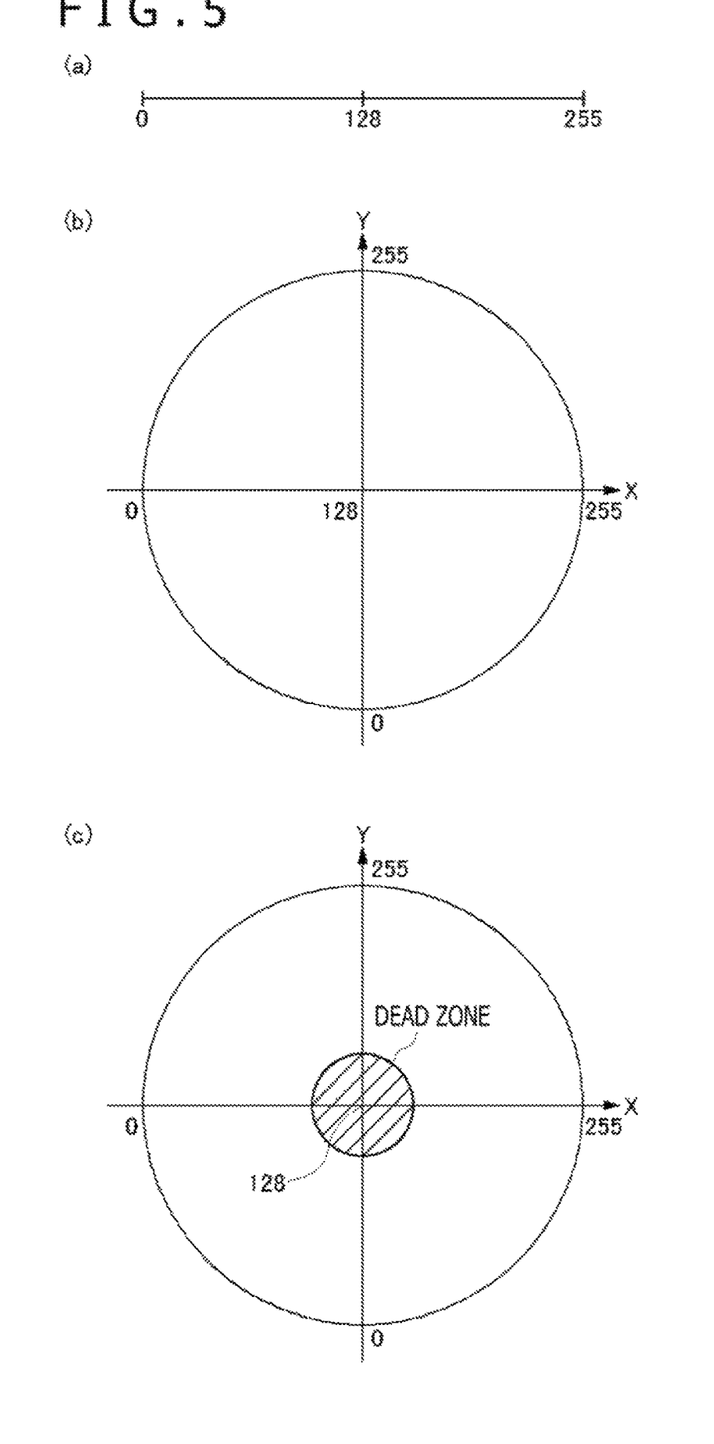
FIG. 5 represents diagrams each depicting an output range of a right analog stick.

FIG. 5(a) depicts an output range of a single axis component of the right analog stick 77a. The output processing section 150 performs a round-off process on each axis component in the operation signal of the right analog stick 77a, and outputs the X-axis component and the Y-axis component each as an integer value from 0 to 255.

FIG. 5(b) depicts an output range of the X-axis component and the Y-axis component of the right analog stick 77a. When the right analog stick 77a is at the center position, the output processing section 150 provides the operation signal, in which a signal value of the X-axis component is 128 and a signal value of the Y-axis component is 128, to the game.

The game does not receive all signal values in the entire output range of the right analog stick 77a as valid inputs, but the game often sets a dead zone to operations near the center position and ignores the signal values in the dead zone. One reason for this setting is as follows. Since accuracy of a position sensor provided in the right analog stick 77a is not quite high, there is no denying a probability that the operation signal indicating that the right analog stick 77a is at a position deviated from the center position (128, 128) is output even without user's touch of the right analog stick 77a. Another reason is as follows. Since the user places the right thumb on a top of the right analog stick 77a, a motion such as a tremble of the thumb often results in a motion of the right analog stick 77a even without a user's intention to operate the right analog stick 77a. Owing to these, in a case of utilizing the right analog stick 77a for aiming the telescopic sight in an FPS game, the operation signals are not stable near the center position, and the telescopic sight is difficult to accurately aim. To address the problem, the game is designed to set the dead zone for operations near the center position of the right analog stick 77a and to receive operations beyond the dead zone as valid inputs.

FIG. 5(c) depicts an example of the dead zone set by the game to the output range of the right analog stick 77a. In this example, the dead zone is set as a range of a circle at a predetermined diameter about the center position (128, 128). The game may freely set the range of the dead zone, for example, as a rectangular range about the center position. The game ignores operation signals in the dead zone, that is, does not reflect the operation signals in processing in the game.

The information processing apparatus 10 according to the embodiment has a function to enable the user to utilize the mouse 12 as an alternative to the right analog stick 77a. The user can thereby operate the mouse 12 to aim the telescopic sight. The information processing apparatus 10 according to the embodiment also has a function to enable the user to utilize the keyboard 14 as an alternative to the input section other than the right analog stick 77a of the game controller 6. These functions enable the user to utilize the mouse 12 and the keyboard 14 as the input devices as an alternative to the game controller 6. As described later, the user can operate the game controller 6 simultaneously with operating on the mouse 12 or the keyboard 14.

To enable the user to utilize the mouse 12 or the keyboard 14 as the input device, the game prepares a setting file in which data for converting the operation signal of the mouse 12 into the operation signal of the right analog stick 77a and data for converting the operation signal of the keyboard 14 into the operation signal of the game controller 6 are described. An adjustment value for sensitivity of the mouse 12, data that configures a conversion curve for converting the movement amount of the mouse 12 into the operation signal of the right analog stick 77a, data related to the dead zone set to right analog stick outputs, and a key conversion map for converting inputs of the keyboard 14 into inputs of the game controller 6 are described in the setting file.

Figure 6:
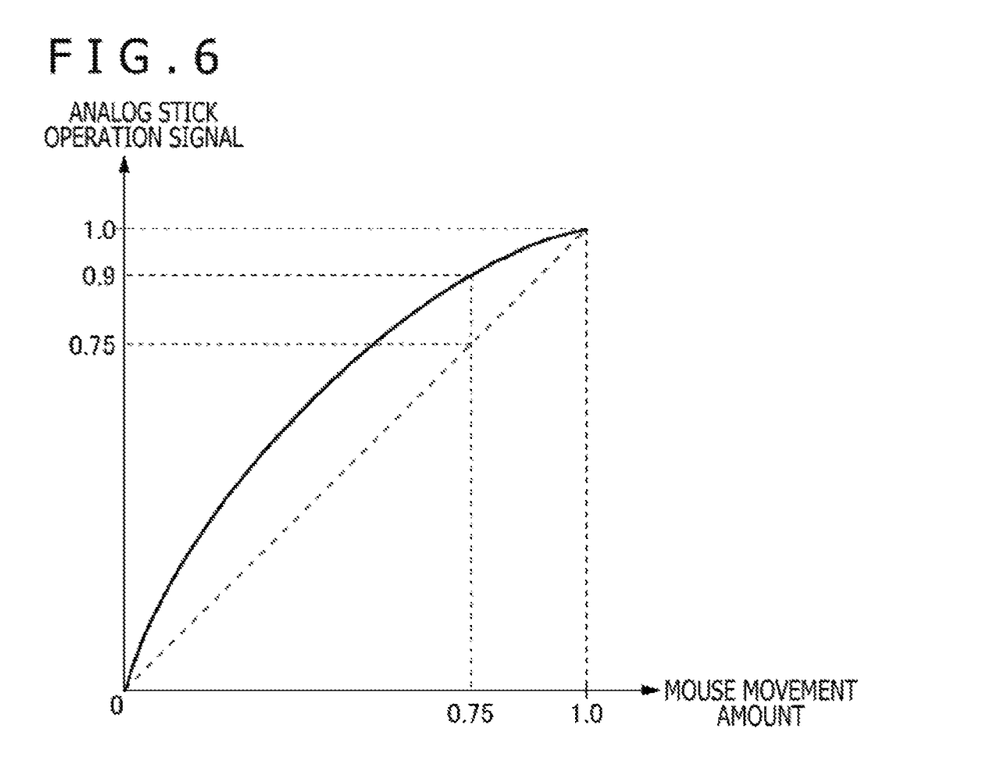
FIG. 6 is a diagram depicting an example of a conversion curve.

FIG. 6 depicts an example of the conversion curve for converting the movement amount of the mouse into the operation signal of the right analog stick. A horizontal axis of this conversion curve expresses the movement amount of the mouse 12, and a mouse movement amount "1.0" indicates a movement amount when the mouse 12 is moved by a predetermined movement amount or more. The predetermined movement amount of the mouse 12 corresponds herein to a maximum tilt amount of the right analog stick 77a. A vertical axis expresses the operation signal of the right analog stick 77a, and a right analog stick operation signal "1.0" indicates a maximum value of the tilt amount.

According to this conversion curve, when the mouse movement amount is, for example, 0.75, that is, when the mouse 12 is moved by three-quarters of the predetermined movement amount, the operation signal of the right analog stick 77a is set to 0.9. In other words, according to this conversion curve, the mouse movement amount 0.75 is converted into the right analog stick operation signal 0.9. In a case of defining (right analog stick operation signal)/(mouse movement amount) as an "amplification factor," this means that the conversion curve defines an amplification factor of the right analog stick operation signal relative to the normalized mouse movement amount. Handling a relationship between the mouse movement amount and the right analog stick operation signal not linearly but in such a manner as to change the amplification factor makes it possible to freely set operational feeling of the mouse 12. In a case of handling the relationship between the mouse movement amount and the right analog stick operation signal linearly, then the amplification factor of the right analog stick operation signal relative to the mouse movement amount is always "1," and the conversion curve is transformed into a straight line connecting (0, 0) to (1.0, 1.0).

The key conversion map describes a correspondence relationship between keys of the keyboard 14 and the input sections of the game controller 6. An example of the conversion map describing the keys of the keyboard 14 on left columns and the input sections of the game controller 6 on right columns is as follows.

"Q"—Δ button
"R"—□ button
"C"—○ button
"Space"—× button
"Arrow keys"—direction buttons
"ESC key"—OPTIONS button
"ENTER key"—SHARE button While the above example illustrates part of the input sections of the game controller 6, keys of the keyboard 14 are similarly allocated to the other input sections.

The setting section 140 acquires a setting file 200 corresponding to the game and provides the setting file 200 to the conversion processing section 120. The setting file 200 is contained in the game software, and the setting section 140 preferably, automatically acquires the setting file 200 and provides the setting file 200 to the conversion processing section 120 upon activation of the game software.

The game software may have a plurality of types of setting files 200. The conversion curve depicted in FIG. 6 institutes a conversion characteristic of converting the mouse movement amount into the right analog stick operation signal, while the key conversion map institutes key allocation. Since the conversion curve and the key conversion map vary depending on user's preference, a plurality of setting files 200 that specify various types of conversion curves and key conversion maps may be prepared so that the user can select any of the setting files 200 depending on a game title or the mouse 12 to be used. In this case, the setting section 140 acquires the user's selected setting file 200 and provides the setting file 200 to the conversion processing section 120. It is noted that the user may be able to rewrite the setting file provided by the setting section 140 to the conversion processing section 120.

It is noted that a plurality of types of setting files 200 may be stored in a storage device of the information processing apparatus 10, and that the setting section 140 may automatically read the setting file corresponding to the title of the activated game from the storage device and provide the setting file to the conversion processing section 120. The setting file read from the storage device may be designated by the title of the game or specified by a correspondence table in which titles of games are made to correspond to the setting files.

The keyboard 14 outputs data about the key operated by the user as a key operation signal. The key operation signal acquisition section 106 acquires the key operation signal and provides the key operation signal to the key conversion section 130. The key conversion section 130 converts the key operation signal into the operation signal of one input section of the game controller 6 in accordance with the key conversion map, and the output processing section 100 provides the operation signal obtained by conversion to the game.

The mouse 12 outputs the operation signal indicating movement amounts of an x-axis component and a y-axis component in a predetermined cycle. The output cycle of the mouse 12 is set shorter than a cycle (for example, 60 fps) in which the game creates a game screen. The mouse operation signal acquisition section 104 acquires the x-axis component and the y-axis component of the mouse operation signal output in the predetermined cycle and supplies the x-axis component and the y-axis component to the conversion processing section 120. The conversion processing section 120 converts the mouse operation signal into an analog stick operation signal of the game controller 6, and the output processing section 150 provides the analog stick operation signal obtained by conversion to the game.

Figure 7:
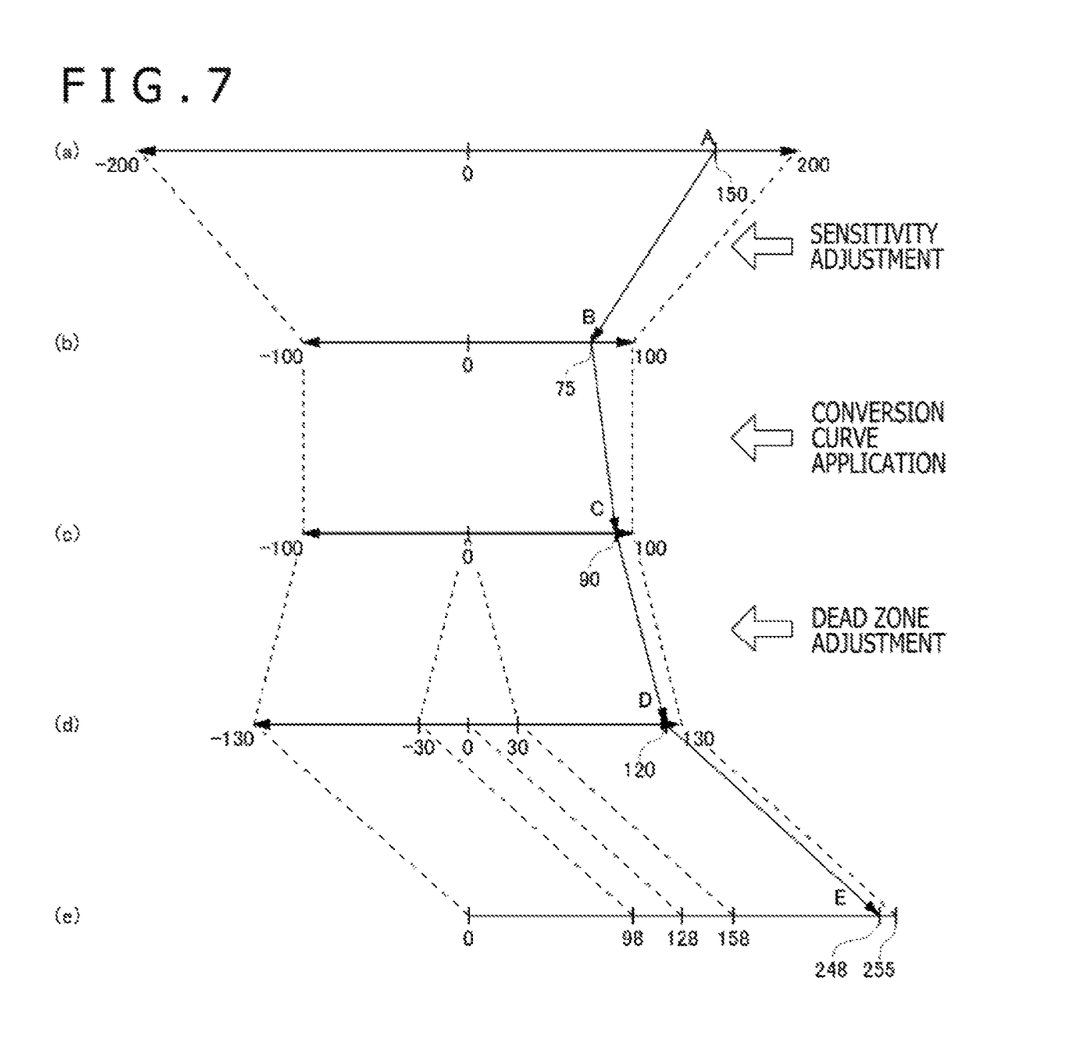
FIG. 7 represents explanatory diagrams of a mouse operation signal conversion process.

FIG. 7 depicts explanatory diagrams of a mouse operation signal conversion process in the conversion processing section 120.

FIG. 7(a) depicts an output range of each axis component in the operation signal of the mouse 12. The mouse operation signal acquisition section 104 acquires the x-axis component and the y-axis component of the mouse operation signal. In FIG. 7(a), a value "200" indicated as a demarcation of the output range of the mouse 12 indicates a realistically assumed virtual maximum value output from the mouse 12 operated by the user during game playing, and does not mean that the maximum value output from the mouse 12 is limited to 200. In other words, on the assumption that the signal value of each axis component acquired by the mouse operation signal acquisition section 104 when the user operates the mouse 12 to aim the telescopic sight is approximately in a range from −200 to 200, FIG. 7(a) depicts the range from −200 to 200 as a virtual output range to facilitate understanding of the present invention. It is noted that there is no problem even if the signal value of each axis component is over 200. A flow of conversion of a signal value A (=150) of the mouse 12 into a signal value E of the right analog stick 77a in the conversion processing section 120 will be described below.

The mouse operation signal acquisition section 104 supplies the acquired mouse operation signal to the sensitivity adjustment section 122. The sensitivity adjustment section 122 adjusts sensitivity of the mouse operation signal.

FIG. 7(b) depicts the output range of each sensitivity-adjusted axis component. The sensitivity adjustment section 122 makes sensitivity adjustment by multiplying the signal value of the mouse operation signal by a sensitivity adjustment value. The sensitivity adjustment value is contained in the setting file 200 and is 0.5 in this example. The sensitivity adjustment section 122 multiplies the signal value A by 0.5 to convert the signal value A into a signal value B (=75).

The conversion curve application section 124 applies the conversion curve to the sensitivity-adjusted mouse operation signal.

FIG. 7(c) depicts a state of applying the conversion curve to the sensitivity-adjusted mouse operation signal. The conversion curve application section 124 multiplies the sensitivity-adjusted mouse operation signal by the amplification factor instituted by the conversion curve depicted in FIG. 6. If the amplification factor corresponding to the sensitivity-adjusted signal value 75 is 1.2 on the conversion curve depicted in FIG. 6, the conversion curve application section 124 multiplies the signal value B by 1.2 to convert the signal value B into a signal value C (=90).

The dead zone adjustment section 126 adds a signal part corresponding to the dead zone set to the right analog stick 77a to the mouse operation signal to which the conversion curve has been applied. The dead zone adjustment section 126 prevents the mouse operation signal from indicating the signal value in the dead zone by adding the signal part corresponding to the dead zone to the mouse operation signal.

FIG. 7(d) depicts the output range of each axis component having been subjected to dead zone adjustment. In FIG. 7(d), a range from −30 to 30 corresponds to the dead zone, and the dead zone adjustment section 126 adds 30 to the signal value C to convert the signal value C into a signal value D (=120). It is noted that the dead zone adjustment section 126 adds −30 to the signal value C to convert the signal value C into the signal value D if the signal value C is negative. In this way, the dead zone adjustment section 126 determines whether the dead zone signal part to be added is negative or positive depending on whether the signal value C is positive or negative. In a case in which the signal value C is 0, the dead zone adjustment section 126 does not perform a process for adding the dead zone signal part.

In a case of setting the dead zone as a circle about the center position of the right analog stick 77a as depicted in FIG. 5(c), a value added as the dead zone to the mouse operation signal varies depending on an operation angle of the mouse 12.

Figure 8:
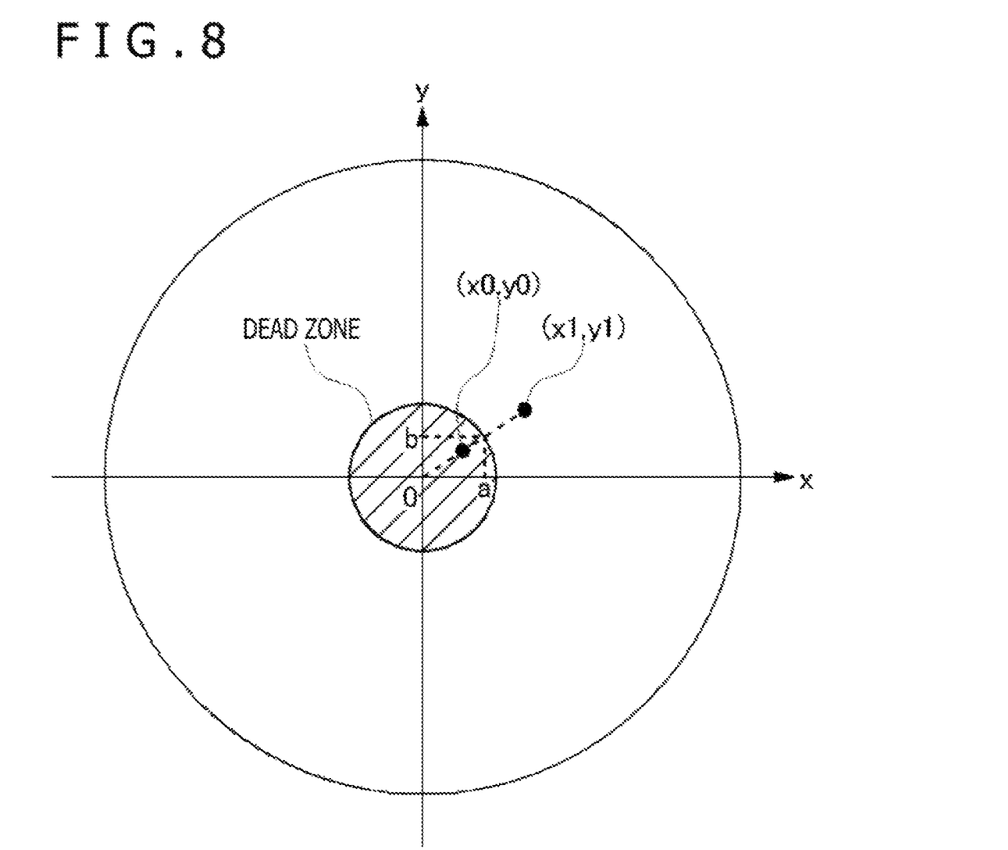
FIG. 8 is an explanatory diagram of a dead zone adjustment process.

FIG. 8 is an explanatory diagram of an adjustment process performed by the dead zone adjustment section 126. The dead zone adjustment section 126 adds the signal part corresponding to the dead zone to the mouse operation signal (x0,y0) to which the conversion curve has been applied in a direction in which the operation angle (Arctan (y0/x0)) of the mouse 12 is maintained.

In a case of setting the dead zone as the circle, the dead zone adjustment section 126 obtains an intersecting point (a,b) between a straight line passing through (x0,y0) from an origin and a boundary portion of the dead zone. Here, 'a' is a signal part corresponding to the dead zone of the x-axis component and 'b' is a signal part corresponding to the dead zone of the y-axis component. The dead zone adjustment section 126 thereby adds the signal part (a,b) corresponding to the dead zone to the mouse operation signal (x0,y0) to generate a mouse operation signal (x1,y1) having been subjected to adjustment of the signal value in the dead zone. Here, x1=x0+a and y1=y0+b. The dead zone adjustment section 126 generates the mouse operation signal to which the signal part corresponding to the dead zone has been added while maintaining the operation angle of the mouse 12; thus, a slight motion of the mouth 12 is reflected in the aim of the telescopic sight.

The mouse operation signal having been subjected to dead zone adjustment is supplied to the analog stick operation signal generation section 128. The analog stick operation signal generation section 128 generates the operation signal of the right analog stick 77a from the mouse operation signal.

FIG. 7(e) depicts a state of generating the analog stick operation signal from the mouse operation signal. Since the analog stick operation signal takes on a signal value from 0 to 255, the analog stick operation signal generation section 128 performs a process for adjusting the output range depicted in FIG. 7(d) to that of the analog stick operation signal.

The center position of the right analog stick 77a is 128, and the analog stick operation signal generation section 128 generates the analog stick operation signal by adding 128 to the signal value indicated in FIG. 7(d). The analog stick operation signal generation section 128 adds 128 to the signal value D to generate the signal value E (=248) of the right analog stick 77a.

It is noted that the analog stick operation signal generation section 128 sets the signal value smaller than 0 and the signal value greater than 255 to the signal value 255 as a result of adding 128 to the signal value. In other words, the analog stick operation signal generation section 128 sets the signal value out of the range from 0 to 255 to the signal value 0 or 255.

Furthermore, since the analog stick operation signal takes on an integer value from 0 to 255, the analog stick operation signal generation section 128 performs a round-off process on the mouse operation signal for the signal value to which 128 is added to the mouse operation signal value, and converts the signal value into an integer value.

Figure 9:
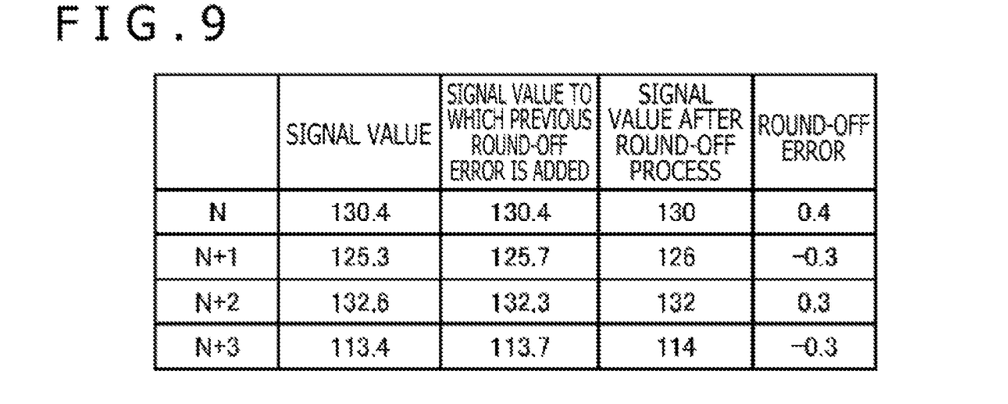
FIG. 9 is an explanatory diagram of a round-off process.

FIG. 9 is an explanatory diagram of the round-off process. In a case in which a game generates the game screen at 60 fps, the analog stick operation signal generation section 128 performs the round-off process in a frame generation cycle, that is, every (1/60) second.

A "signal value" is a current signal value to which 128 is added to the mouse operation signal. A "signal value to which previous round-off error is added" is a signal value obtained by adding a round-off error in a previous round-off process to the "signal value." A "signal value after round-off process" is a signal value obtained by rounding off the "signal value to which previous round-off error is added" to the closest whole number to perform a current round-off process. A "round-off error" is a difference between the "signal value to which previous round-off error is added" and the "signal value after round-off process" and is a round-off error in the current round-off process.

If the round-off error in an N-th round-off process is 0.4, the analog stick operation signal generation section 128 adds the previous round-off error (0.4) to the current signal value (125.3) in an (N+1)-th round-off process, performs the round-off process, and generates an operation signal value (126) of the right analog stick 77a. As a result, the round-off error in the (N+1)-th round-off process is −0.3.

In an (N+2)-th round-off process, the analog stick operation signal generation section 128 adds the previous round-off error (−0.3) to a current signal value (132.6), performs the round-off process, and generates an operation signal value (132) of the right analog stick 77a. As a result, the round-off error in the (N+2)-th round-off process is 0.3.

In this way, the analog stick, operation signal generation section 128 preforms the round-off process after adding the round-off error in the previous round-off process performed on the mouse operation signal to the current mouse operation signal. Performing the round-off process in this way enables the analog stick operation signal generation section 128 to contain the previous round-off error in the current operation signal of the right analog stick 77a and to thereby generate the operation signal of the right analog stick 77a highly accurately reflective of the movement amount of the mouse 12 by the user. The analog stick operation signal generation section 128 supplies the generated operation signal of the right analog stick 77a to the output processing section 150. The output processing section 150 supplies the operation signal of the right analog stick 77a to the game.

In the embodiment, it is possible to freely control conversion timing since the conversion processing section 120 converts the mouse operation signal into the analog stick operation signal. In the case, for example, in which the game creates the screen at 60 fps, the conversion processing section 120 may set a cycle of the conversion timing to (1/60) second. Furthermore, the conversion processing section 120 may convert the mouse operation signal into the analog stick operation signal at the same timing as that at which the game requests the operation signal.

Moreover, the conversion processing section 120 can select an arbitrary mouse operation signal as an object to be converted among mouse operation signals transmitted in the shorter output cycle than the cycle (for example, 60 fps) in which the game generates the game screen. For example, the conversion processing section 120 may convert the latest mouse operation signal in the conversion cycle among the mouse operation signals transmitted in a predetermined cycle into the analog stick operation signal. Furthermore, the conversion processing section 120 may add up a plurality of mouse operation signals in the conversion cycle and convert an addition value into the analog stick operation signal.

It is noted that the information processing apparatus 10 according to the embodiment is designed to permit simultaneous operations of the mouse 12 and the right analog stick 77a. In a case of simultaneously operating the mouse 12 and the right analog stick 77a, the output processing section 150 adds up the analog stick operation signal generated by the analog stick operation signal generation section 128 and the analog stick operation signal acquired by the controller operation signal acquisition section 102 and outputs an addition value to the game. It is noted that the output processing section 150 needs to output a signal value obtained by subtracting 128 from the addition value to the game since the center position of the analog stick operation signal is 128.

It is noted that the dead zone is set by the game for the operations near the center position of the right analog stick 77a. In a case of not using the mouse 12 and using only the right analog stick 77a, the game may ignore the operation signals in the dead zone. In a case of using the mouse 12, the dead zone adjustment section 126 makes adjustment such that the mouse operation signal does not indicate the signal value in the dead zone. It is, therefore, preferable that in the case of simultaneously using the mouse 12 and the right analog stick 77a and the analog stick operation signal of the right analog stick 77a belongs to the dead zone, the output processing section 150 abandons the analog stick operation signal without addition. It is also preferable that in a case in which the operation signal of the right analog stick 77a deviates from the dead zone, the output processing section 150 applies the conversion curve to the analog stick operation signal and then adds the resultant analog stick operation signal to the analog stick operation signal generated by the analog stick operation signal generation section 128.

The present invention has been described so far on the basis of the embodiment. This embodiment is given as an example, and a person skilled in the art would understand that various modifications can be made for combinations of constituent elements and processing processes and that such modifications fail within the scope of the present invention.

While the sensitivity adjustment value set by the sensitivity adjustment section 122 is not specifically distinguished between the x-axis component and the y-axis component in the embodiment, the sensitivity adjustment section 122 may separately set the sensitivity adjustment value for the x-axis component and that for the y-axis component and specifies, for example, the sensitivity adjustment value of the x-axis component>sensitivity adjustment value of the y-axis component. Furthermore, while the analog stick operation signal generation section 128 performs the entire round-off process in the embodiment, the analog stick operation signal generation section 128 may calculate the signal value to which the previous round-off error has been added and the output processing section 150 may perform the round-off process on the signal value to which the previous round-off error has been added. The output processing section 150 passes the round-off error generated by the round-off process to the analog stick operation signal generation section 128 after performing the round-off process.

The conversion inspection section 160 is provided to a inspect a conversion function of the conversion processing section 120. After the setting section 140 supplies the setting file 200 to the conversion processing section 120, the conversion inspection section 160 inspects whether the conversion processing section 120 can appropriately convert the mouse operation signal into the analog stick operation signal.

The mouse operation signal generation section 162 generates an operation signal of the mouse that serves as a known orbit and passes the operation signal to the conversion processing section 120. The mouse operation signal generation section 162 generates the operation signal of the mouse that draws, for example, a perfect circle orbit, when the conversion processing section 120 converts the mouse operation signal into the analog stick operation signal and the output processing section 150 passes the analog stick operation signal to the game, the game draws an orbit, based on the analog stick operation signal on a virtual game screen. The confirmation section 164 confirms whether the orbit by this analog stick operation signal is the original known orbit, which is the perfect circle. If the orbit is a perfect circle, the confirmation section 164 determines that there is no problem in the conversion process performed by the conversion processing section 120. If the orbit is not the perfect circle, the confirmation section 164 determines that the conversion process is not normal. At this time, the confirmation section 164 may adjust parameters of the setting file 200 and repeat an inspection until the perfect circle can be drawn.

REFERENCE SIGNS LIST

1 Information processing system
6 Game controller
10 Information processing apparatus
12 Mouse
14 Keyboard
77a Right analog stick
100 Acquisition section
102 Controller operation signal acquisition section
104 Mouse operation signal acquisition section
106 Key operation signal acquisition section
120 Conversion processing section
122 Sensitivity adjustment section
124 Conversion curve application section
126 Dead zone adjustment section
128 Analog stick operation signal generation section
130 Key conversion section
140 Setting section
150 Output processing section
160 Conversion inspection section
162 Mouse operation signal generation section
164 Confirmation section
200 Setting file

INDUSTRIAL APPLICABILITY

The present invention is applicable to a field of providing an operation signal of an input device to a game.

The invention claimed is:

1. An information processing apparatus for providing an operation signal of a controller to a game, comprising:
   an acquisition section that acquires a mouse operation signal;
   a conversion processing section that converts the mouse operation signal into an analog stick operation signal of the controller; and
   an output processing section that provides the analog stick operation signal obtained by conversion to the game, wherein
   the conversion processing section includes
   a dead zone adjustment section that adds a signal part corresponding to a dead zone set to an analog stick, to the mouse operation signal; and
   an analog stick operation signal generation section that generates the analog stick operation signal from the mouse operation signal having been subjected to dead zone adjustment, and
   the dead zone adjustment section adds the signal part corresponding to the dead zone in a direction in which an operation angle of a mouse is maintained.

2. The information processing apparatus according to claim 1, wherein
   the analog stick operation signal generation section performs a round-off process on the mouse operation signal, the analog stick operation signal generation section performing the round-off process after adding a round-off error in a previous round-off process to a current mouse operation signal.

3. The information processing apparatus according to claim 1, further comprising:
   a controller having an analog stick;
   a mouse for supplying the mouse operation signal,
   wherein the acquisition section acquires an operation signal of the analog stick of the controller, and
   in a case of simultaneously operating the mouse and the analog stick, the output processing section adds up the analog stick operation signal generated by the analog stick operation signal generation section and the analog stick operation signal acquired by the acquisition section and outputs an addition value to the game.

4. The information processing apparatus according to claim 3, wherein
   in a case in which the analog stick operation signal acquired by the acquisition section belongs to the dead zone, the output processing section does not add the analog stick operation signal.

5. The information processing apparatus according to claim 1, further comprising:
   a setting section that provides a setting file, which contains a sensitivity adjustment value of the mouse, a conversion curve for converting a movement amount of the mouse into the operation signal of the analog stick, data related to the dead zone set to outputs from the analog stick, and a key conversion map for converting inputs from a keyboard into inputs from the game controller,
   wherein the conversion curve is non-linear.

6. The information processing apparatus according to claim 1, further comprising:
   a conversion inspection section for inspecting a conversion function of the conversion processing section, wherein
   the conversion inspection section includes
   a mouse operation signal generation section that generates an operation signal of the mouse that serves as a known orbit; and
   a confirmation section that confirms whether the orbit by the analog stick operation signal into which the conversion processing section has converted the operation signal of the mouse generated by the mouse operation signal generation section is the known orbit.

7. A method of converting an operation signal of a mouse into an operation signal of an analog stick in an information processing apparatus for providing the operation signal of the analog stick to a game, the method comprising:
   acquiring a mouse operation signal;
   adding a signal part corresponding to a dead zone set to an analog stick, to the mouse operation signal; and generating an analog stick operation signal from the mouse operation signal having been subjected to dead zone adjustment, wherein the adding the signal part corresponding to the dead zone includes adding the signal part corresponding to the dead zone to the mouse operation signal in a direction in which an operation angle of the mouse is maintained.

8. A non-transitory computer readable medium having stored thereon a program for a computer that provides an operation signal of an analog stick to a game, the program comprising:

by an acquisition section, acquiring a mouse operation signal;

by a dead zone adjustment section, adding a signal part corresponding to a dead zone set to the analog stick, to the mouse operation signal; and by an analog stick operation signal generation section, generating an analog stick operation signal from the mouse operation signal having been subjected to dead zone adjustment, wherein the dead zone adjustment section adds the signal part corresponding to the dead zone includes adding the signal part corresponding to the dead zone to the mouse operation signal in a direction in which an operation angle of the mouse is maintained.

* * * * *